United States Patent [19]

Olt, Jr.

[11] 4,385,673
[45] May 31, 1983

[54] SPHERICAL JOINT WITH FLEXIBLE SEALS

[75] Inventor: Arthur E. Olt, Jr., Pekin, Ill.

[73] Assignee: Caterpillar Tractor Co., Peoria, Ill.

[21] Appl. No.: 250,756

[22] PCT Filed: Sep. 26, 1980

[86] PCT No.: PCT/US80/01255
§ 371 Date: Sep. 26, 1980
§ 102(e) Date: Sep. 26, 1980

[87] PCT Pub. No.: WO82/01227
PCT Pub. Date: Apr. 15, 1982

[51] Int. Cl.³ .............................................. B62D 55/00
[52] U.S. Cl. ......................................... 180/9.5; 403/57
[58] Field of Search .................... 403/57, 53, 52, 58; 180/9.5; 308/72, 36.1

[56] References Cited

U.S. PATENT DOCUMENTS 3,680,924  8/1972  Otto et al. .............................. 305/11
4,034,996  7/1977  Manita et al. ......................... 403/140
4,232,754 11/1980  Corrigan et al. ...................... 180/9.5

*Primary Examiner*—Lenard A. Footland
*Attorney, Agent, or Firm*—Phillips, Moore, Lempio & Finley

[57] ABSTRACT

Spherical joints of the type pivotally connecting each end of an equalizer bar to a track roller frame of a track-type vehicle require positive sealing of the joints during operation of the vehicle wherein the joint undergoes compound movements. Standard sealing assemblies therefor are prone to failure since they are subjected to tensile and compressive forces during operation thereof. The improved seal assembly (15) of this invention substantially prevents the imposition of such forces thereon by including structure (23) for permitting flexing thereof.

12 Claims, 4 Drawing Figures

SPHERICAL JOINT WITH FLEXIBLE SEALS

TECHNICAL FIELD

This invention relates generally to spherical joints and more particularly to a spherical joint having a pair of flexible seals mounted therein.

BACKGROUND ART

Spherical joints, wherein a pair of members are connected together for compound movements by a semispherical bearing having a journal mounted therein, are normally sealed by a pair of annular seal assemblies disposed on either side of the journal. Sealing of the joint is particularly important in application of the joint to construction vehicles, such as the pivotal joint connecting each end of an equalizer bar to a track roller frame of a track-type vehicle. During operation of the vehicle in the heavy dust-laden environments, the transversely disposed equalizer bar and track roller frame will be subjected to relative rotational movement about a journal pin of the joint and pivotal movement transverse to such rotational movement.

It is during this latter pivotal movement that the seal assemblies are subjected to tensile and compressive forces which tend to curtail the service life of the seal assemblies. Seal assemblies of this type are illustrated in FIG. 4 of the drawings with each seal assembly comprising a pair of radially disposed retaining rings having an elastomeric seal compressed therebetween. In addition to being subjected to tensile and compressive forces during pivotal movement P", the elastomeric seals are subjected to torsional stresses when relative rotational movement occurs between the equalizer bar and track roller frame.

Furthermore, the relatively tall cross-section of the seal tends to make it difficult to incorporate the seal assembly in certain designs wherein space limitations are critical. Also, conventional seal assemblies of this type are expensive to manufacture and install, as well as service, due to their swaged construction and the inability to employ modern manufacturing techniques, such as injection molding, for the fabrication of the elastomeric seal. Limitations are also placed on the design of the journal since the inner retaining ring of the seal assembly is press-fitted onto the pin. The rather severe operating forces imposed on the elastomeric seal further dictate the need for a relatively soft elastomeric composition for the seal, such as Neoprene, which must be precompressed to enable the seal assembly to counteract high stresses imposed thereon.

The present invention is directed to overcoming one or more of the problems as set forth above.

DISCLOSURE OF INVENTION

In one aspect of the present invention, an improved spherical joint comprises a pair of members having a semi-spherical bearing and journal mounted therebetween, with the members being adapted for relative rotational movement about a longitudinal axis of the journal and relative pivotal movement transverse to such rotational movement. An annular seal assembly is mounted between the members and on each side of the journal with the improvement comprising means for permitting flexing of the seal assembly to at least substantially prevent stretching or compression thereof in response to the relative pivotal movement between the first and second members.

The spherical joint is preferably used to connect each end of an equalizer bar to a respective track roller frame of a track-type vehicle.

In another aspect of this invention, the seal assembly includes an elastomeric member mounted between inner and outer rings and a lip seal mounted on the inner ring.

In still another aspect of this invention, the seal assembly includes an elastomeric member having a main body portion intersected by an imaginary conical plane and a lip seal mounted in the seal assembly.

The improved seal assembly thus provides the spherical joint with a long service life, substantially reduces the overall cost thereof in comparison to conventional joints employing standard seal assemblies therein, and provides a highly serviceable seal assembly which satisfies minimum space requirements.

BRIEF DESCRIPTION OF THE DRAWINGS

Other advantages and objects of this invention will become apparent from the following description and accompanying drawings wherein.

BEST MODE OF CARRYING OUT THE INVENTION

Figure 1:
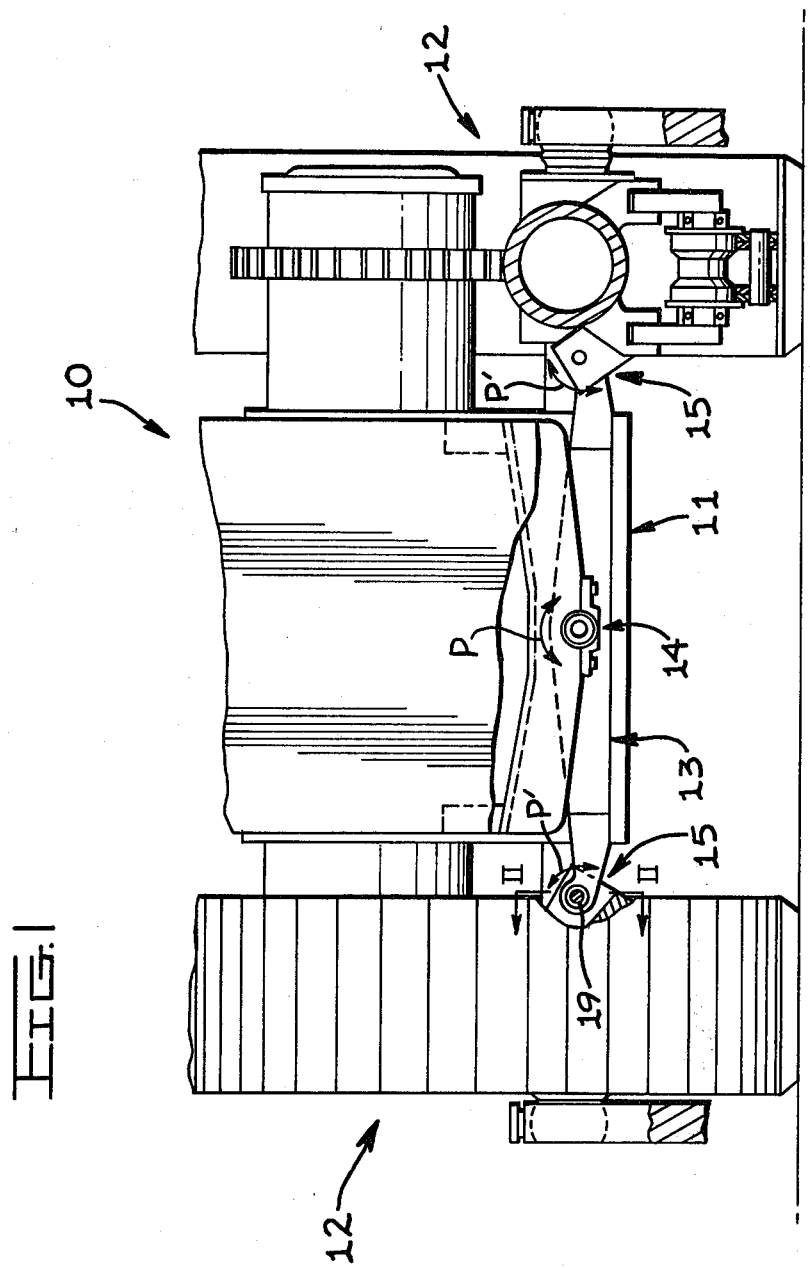
FIG. 1 is a partially sectioned front elevational view of a track-type vehicle having each end of an equalizer bar pivotally connected to a track roller frame by a spherical joint embodiment of the present invention.

FIG. 1 illustrates a track-type vehicle 10, such as a track-type tractor, having a main frame 11 and a pair of laterally spaced track roller frames 12 mounted on either side of the main frame in a conventional manner. Forward ends of track roller frames 12 are pivotally connected to main frame 11 by a laterally extending equalizer bar 13, pivotally connected to the main frame by a standard pivot connection 14. A spherical joint 15, embodying this invention, pivotally connects each lateral end of equalizer bar 13 to a respective track roller frame 12.

Referring to FIG. 1, during operation of tractor 10, equalizer bar 13 will pivot about pivot joint 14, as indicated by arrow P. Simultaneously therewith, relative pivotal movement P' will normally occur as between each track roller frame 12 and equalizer bar 13. Furthermore and referring to FIG. 2, joint 15 will be also subjected to pivotal movement P", about a pivotal axis A of the joint. Vehicles of this type operate in heavily dust-laden environments, thus requiring that joint 15 be fully sealed to prevent abrasion and potential damage to the bearing surfaces thereof.

Figure 2:
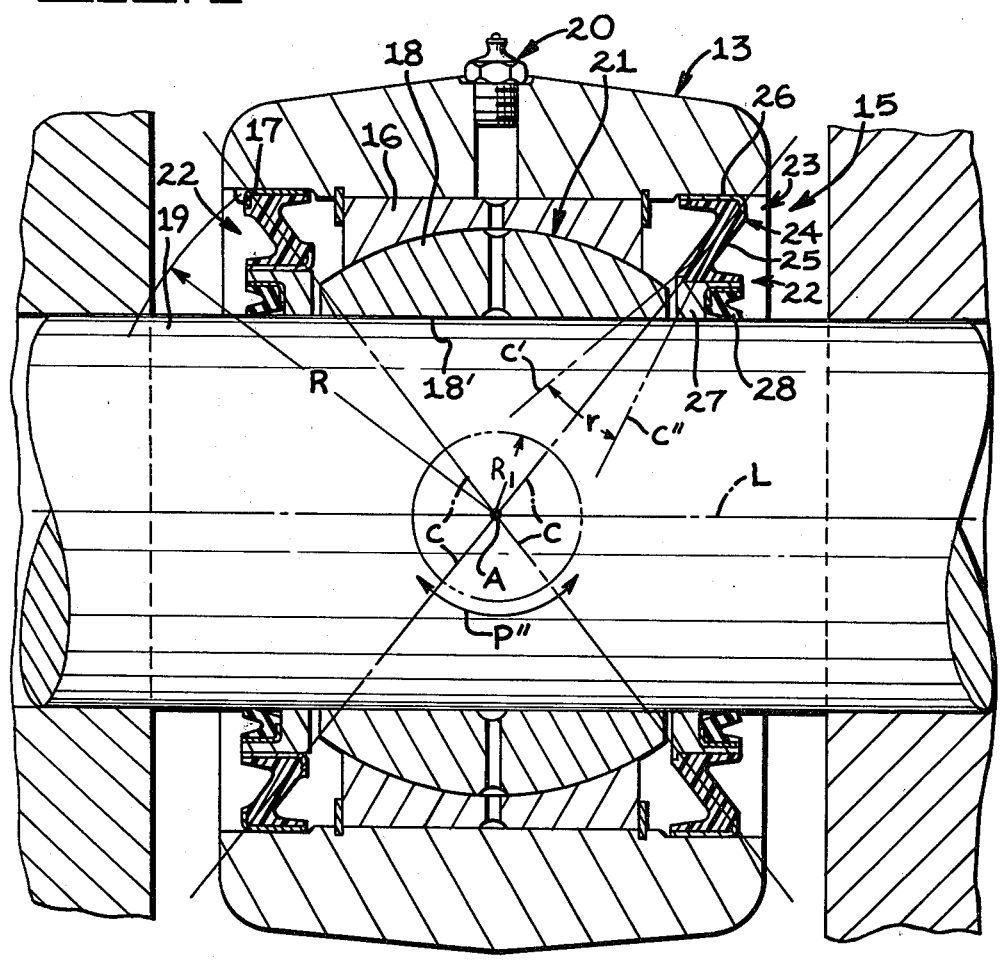
FIG. 2 is an enlarged sectional view through the joint, taken in the direction of arrows II—II in FIG. 1.

Referring to FIG. 2, each joint 15 includes an annular bearing 16 secured within a through bore 17, formed through equalizer bar or first member 13. A journal 18 is mounted in bearing 16 and is further mounted on a journal pin or second member 19. A standard grease fitting 20 and appropriate intercommunicating passages may be formed in joint 15, as shown, to continuously lubricate mating, semispherical bearing surfaces 21 of bearing 16 and surface 18' of journal 18.

A pair of annular seal assemblies 22 are mounted between equalizer bar 13 and pin 19 on each side of bearing 16 and journal 18 to continuously seal joint 15 during operation thereof. Each seal assembly 22 includes means 23 for permitting flexing of seal assembly 22 to at least substantially prevent stretching or compression thereof in response to relative pivotal movement P″ (FIG. 2), between equalizer bar 13 and pin 19.

Means 23 includes a flexible member 24, shown as preferably having a generally Z-shaped cross section in FIG. 2. A frusto-conically shaped main body portion 25 of member 24 at least substantially lies in a conical plane C, having its apex at pivot point A of spherical joint 15 which intersects a longitudinal axis L of journal pin 19. It can be seen in FIG. 2 that this construction and arrangement will induce flexing of carrier 24 and, thus, seal assembly 22, rather than any tensioning or compression thereof.

Member 24 proper may be composed of a flexible elastomeric material, such as a relatively tough urethane compound (e.g., "Hytrel") which will exhibit a prolonged service life. The outside diameter of a main body portion 25 of member 24 may be bonded or otherwise suitably secured to an annular ring 26 which is press-fitted or otherwise suitably secured within a counterbore of bore 17. The inside diameter of member 24 may be secured on the periphery of an annular ring 27 which carries an annular lip seal 28 on an outboard side thereof.

It should be noted in FIG. 2 that main body portion 25 extends radially inwardly from an outboard end of the seal assembly to an inboard end thereof.

In addition to providing a mounting for lip seal 28, ring 27 functions as a load transfer member which accomodates the difference in spring rates between main body portion 25 and lip seal 28. Forces developed by the flexing of main body portion 25 are transferred to shaft 19, by passing lip seal 28, so as not to affect its sealing capabilities.

Small running clearances are preferably provided between the inside diameters of journal 18 and ring 27 and pin 19 to allow a slide-in and slide-out pin design facilitating assembly and disassembly for servicing purposes. This construction and arrangement further facilitates relative rotational motion between pin 19 and equalizer bar 13 about longitudinal axis L of the pin. Member 24 is thus free from any torsional stresses which would be otherwise imposed thereon.

In order to induce the desired flexing in seal assembly 22, it has been determined that a radius R, subscribing a circle centered at pivot point A and intersecting the outside diameters of seal assemblies 22, is desirably greater than approximately ten times a radius $R_1$, subscribing a circle centered at pivot point A and indicating variance of the pivot point relative to C and within the latter circle. An alternative, preferable design parameter to achieve the desired flexing desiderata is one of varying the cone angle ±10° relative to the optimum "O" angle wherein conical plane C, containing the major axis of body portion 25, intersects pivot point A. This variance is depicted in FIG. 2 by angle r, between conical planes C′ and C″.

If the variance is more than the preferred amount described above, the seal material may become subjected to undesirable stretching and/or compression, rather than flexing, to potentially cause premature seal failure. It should be noted that the "hinge action" thus provided by the flexing of seal assembly 22 will allow the shape thereof to change without causing undesirable distortion. This desiderata may be contrasted with the hereinafter described distortion imparted to the prior art seal assembly 22′ of FIG. 4 upon operation thereof.

Figure 3:
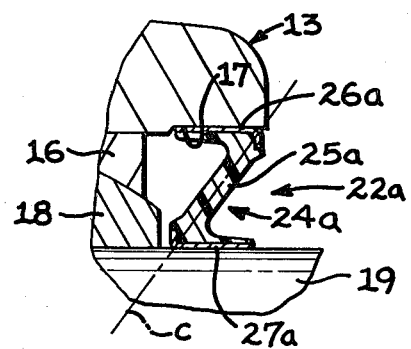
FIG. 3 is a sectional view illustrating a modification of a seal assembly employed in the joint.

FIG. 3 illustrates a modification 22a of seal assembly 22 wherein an elastomeric sealing member 24a, substantially similar to member 24, is bonded or otherwise suitably secured between an outer ring 26a and an inner ring 27a. Rings 26a and 27a may be press-fitted within bore 17 of equalizer bar 13 and on the outside diameter of pin 19, respectively, as shown. Thus, ring 27 and lip seal 28 are eliminated. Main body portion 25a of member 24a lies in a conical plane C′ and flexes whereby seal assembly 22a functions substantially identically to seal assembly 22.

Industrial Applicability

Spherical joint 15 finds particular application to the type of environment illustrated in FIG. 1; namely, the pivotal connection between each end of equalizer bar 13 and a respective track roller frame 12. Upon relative pivoting P′ between a track roller frame 12 and equalizer bar 13 (FIG. 1), seal assembly 22 will remain in a stress-free condition of operation since no torsional loads will be placed thereon. In particular and referring to FIG. 2, such relative pivotal movement between equalizer bar 13 and pin 19 will occur between journal 18 and pin 19 and/or between bearing surfaces 21 of the journal and bearing 16. Since ring 27 is suitably clearanced to rotate relative to pin 19, no torsional stresses will be placed on carrier 24.

Still referring to FIG. 2, when relative pivoting P″ occurs, as between equalizer bar 13 and pin 19, such pivoting will occur at mating bearing surfaces 21 of bearing 16 and journal 18. During this pivoting, carrier 24 as well as lip seal 28 will be at least substantially retained in a stress-free condition of operation since major body portion 25 of the carrier will flex rather than be placed in compression or tension. This advantageous flexing of seal assemblies 22 is primarily occasioned due to the disposition of body portion 25 of each carrier 24 in a conical plane C′ having its focus at or approximately at pivot point A. The same desiderata is provided by modified seal assembly 22a of FIG. 3, wherein main body portion 25a of member 24a thereof also lies in a similar plane C′.

Figure 4:
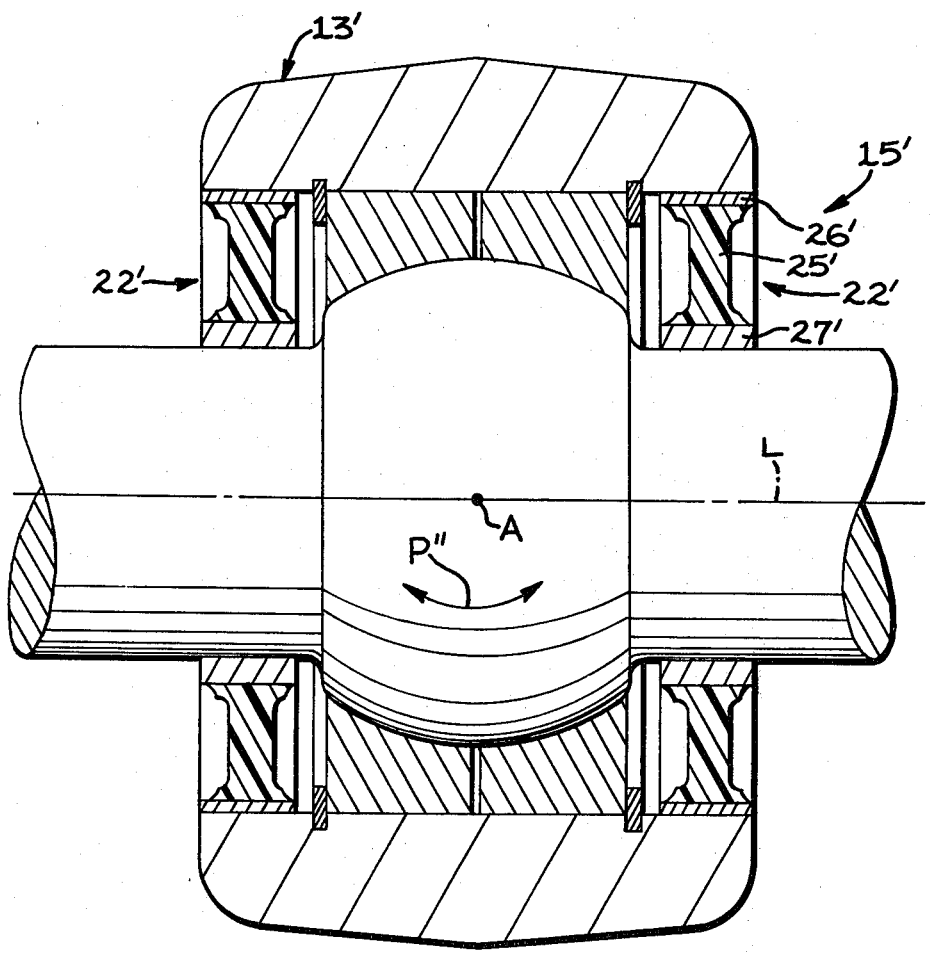
FIG. 4 is a view similar to FIG. 2, but illustrates a conventional spherical joint.

In contrast thereto, FIG. 4 illustrates a standard spherical joint 15′ wherein a pair of laterally spaced seal assemblies 22′ are subjected to tensile stresses and compressive loads upon relative pivotal movement P‴, between an equalizer bar 13′ and a pin 19′. Furthermore, upon relative rotation between equalizer bar 13 and pin 19 about longitudinal axis L of the pin, elastomeric body portion 25′ of each seal assembly 22′ will be subjected to torsional stresses, which could affect the desired service life of the seal assemblies.

Other aspects, objects, and advantages of this invention can be obtained from a study of the drawings, the disclosure, and the appended claims.

I claim:

1. In a track-type vehicle (10) having a pair of laterally spaced track roller frames (12), an equalizer bar (13), and a spherical joint (15) including a pin (19) connecting each end of said equalizer bar (13) to a respective one of said track roller frames (12), said spherical joint (15) further including a semi-spherical bearing (16) mounted in said equalizer bar (13), a journal (18) mounted in said bearing (16) at mating semi-spherical surfaces (21) thereof, said pin having said journal (18) mounted thereon and disposed on a longitudinal axis (L) thereof for first pivotal movement (P') relative to said equalizer bar (13) about said axis (L) and second pivotal movement (P'') relative to said equalizer bar (13) transverse to said first pivotal movement (P'), and an annular seal assembly (22) mounted between said equalizer bar (13) and pin (19) on each side of said journal (18), the improvement comprising:

each said seal assembly (22) including means (23) for permitting flexing of said seal assembly (22) to at least substantially prevent stretching or compression thereof in response to said relative second pivotal movement (P'') between said equalizer bar (13) and said pin 19.

2. The spherical joint of claim 1 wherein said means (23) includes an elastomeric member (24) having a main body portion (25) extending radially inwardly from an outboard end of said seal assembly to an inboard end thereof.

3. The spherical joint of claim 2 wherein an imaginary conical plane (C) intersecting the body portion (25) of said elastomeric member (24) has the apex (A) thereof at least approximately located at the pivot point (A) about which said first (P') and second (P'') relative pivotal movements between said equalizer bar (13) and pin (19) occur.

4. The spherical joint of claim 3 wherein a radius (R), subscribing a large circle centered at said pivot point (A) and intersecting outside diameters of each of said seal assemblies (22), is greater than approximately ten times a radius (R') subscribing a small circle centered at said pivot point (A) and indicating variance of said pivot point (A) within said small circle.

5. The spherical joint of claim 3 wherein a major axis of said body portion lies in a conical plane (C'-C'') selected from a range of angles (r) of ±10° relative to said first-mentioned conical plane (C).

6. The spherical joint of claim 2 wherein each said seal assembly (22) further includes an annular outer ring (26) secured within said first member (13), an annular inner ring (27) mounted on said pin (19), said elastomeric body portion (25) defined in said elastomeric member (24) and secured between said outer (26) and inner (27) rings, and a lip seal (28) mounted on said inner ring (27) and engaging said pin (19) in sealing contact.

7. The spherical joint of claim 6 wherein said inner ring (27) is mounted for relative rotation on said pin (19).

8. The spherical joint of claim 1 wherein said means includes an elastomeric member (24) having a Z-shaped cross-section.

9. The spherical joint of claim 2 wherein each said seal assembly (22) further includes an annular outer ring (26a) secured within said equalizer bar (13) and an annular inner ring (27a) secured on said pin (19), said elastomeric member (24) secured between said outer (26a) and inner (27a) rings.

10. The spherical joint of claim 1 wherein each said seal assembly (22) includes a pair of outer (26) and inner (27) rings, and an elastomeric member (24) secured between said rings (26,27), said elastomeric member (24) including a body portion (25) extending radially inwardly from an outboard end of said seal assembly to an inboard end thereof.

11. In a spherical joint (15) having a first member (13), a semi-spherical bearing (16) mounted in said first member (13), a journal (18) mounted in said bearing (16) at mating semi-spherical surfaces (21) thereof, a second member (19) having said journal (18) mounted thereon and disposed on a longitudinal axis (L) thereof for first pivotal movement (P') relative to said first member (13) about said axis (L) and second pivotal movement (P'') relative to said first member (13) transverse to said first pivotal movement (P'), and an annular seal assembly (22) mounted between said first (13) and second (19) members on each side of said journal (18), the improvement comprising:

each said seal assembly (22) including an elastomeric member (24) having means (23) for permitting flexing of said seal assembly (22) to at least substantially prevent stretching or compression thereof in response to said relative second pivotal movement (P'') between said first (13) and second (19) members, an annular outer ring (26) secured within said first member (13), an annular inner ring (27) mounted on said second member (19), said elastomeric member (24) being secured between said outer (26) and inner (27) rings, and a lip seal (28) mounted on said inner ring (27) and engaging said second member (19) in sealing contact.

12. In a spherical joint (15) having a first member (13), a semi-spherical bearing (16) mounted in said first member (13), a journal (18) mounted in said bearing (16) at mating semi-spherical surfaces (21) thereof, a second member (19) having said journal (18) mounted thereon and disposed on a longitudinal axis (L) thereof for first pivotal movement (P') relative to said first member (13) about said axis (L) and second pivotal movement (P'') relative to said first member (13) transverse to said first pivotal movement (P'), and an annular seal assembly (22) mounted between said first (13) and second (19) members on each side of said journal (18), the improvement comprising:

each said seal assembly (22) including an elastomeric member (24) having a main body portion (25) and means (23) for permitting flexing of said seal assembly (22) to at least substantially prevent stretching or compression thereof in response to said relative second pivotal movement (P'') between said first (13) and second (19) members, an imaginary conical plane (C) intersecting the body portion (25) of said elastomeric member (24) having the apex (A) thereof at least approximately located at the pivot point (A) about which said first (P') and second (P'') relative pivotal movements between said first (13) and second (19) members occur and a lip seal (28) mounted in said seal assembly (22) to engage said second member (19) in sealing contact therewith.

* * * * *